United States Patent [19]
Hoffer et al.

[11] Patent Number: 5,806,542
[45] Date of Patent: Sep. 15, 1998

[54] APPARATUS FOR WASHING VEHICLES

[75] Inventors: Michael I. Hoffer, 319 Hosmer Blvd., Winnipeg, Manitoba, Canada, R3P 0H5; R. Guy Girardin, 103 Royal Oak Drive, Winnipeg, Manitoba, Canada, R3Y 1R1; Brian Keith Chorney, Winnipeg, Canada; Edward Laurent Fleury, Winnipeg, Canada; J. Desmond Bean, Winnipeg, Canada

[73] Assignees: Michael I. Hoffer; R. Guy Girardin, both of Winnipeg, Canada

[21] Appl. No.: 706,772

[22] Filed: Sep. 3, 1996

[51] Int. Cl.⁶ .................................................. B08B 3/02
[52] U.S. Cl. ................... 134/57 R; 134/58 R; 134/113; 134/123; 134/181
[58] Field of Search ...................... 134/172, 180, 134/181, 123, 56 R, 57 R, 58 R, 113

[56] References Cited

U.S. PATENT DOCUMENTS

| | | | |
|---|---|---|---|
| 3,038,481 | 6/1962 | Brechtel | 134/123 |
| 3,339,565 | 9/1967 | Williams | 134/123 |
| 4,726,388 | 2/1988 | Swinehart et al. | 134/123 |
| 4,809,721 | 3/1989 | Messing et al. | 134/123 |
| 4,865,058 | 9/1989 | Crotts et al. | |
| 4,946,513 | 8/1990 | Prato et al. | 134/123 |
| 5,016,662 | 5/1991 | Cortts et al. | |
| 5,090,429 | 2/1992 | Barber | 134/123 |

FOREIGN PATENT DOCUMENTS

| | | | |
|---|---|---|---|
| 597989 | 5/1960 | Canada | 134/123 |
| 2164498 | 7/1973 | Germany | 134/123 |

OTHER PUBLICATIONS

Brochure—AS90 Saturn (4 pages).

*Primary Examiner*—Frankie L. Stinson
*Attorney, Agent, or Firm*—Adrian D. Battison; Murray E. Thrift

[57] ABSTRACT

A washing apparatus designed particularly for road transport vehicles comprises a washing station with a pair of longitudinal rails carrying a carriage for movement along the vehicle. The carriage carries a pair of depending side arms with spray nozzles on the inside surface for spraying the sides of the vehicle. A horizontal beam is supported on a pair of lift carriages to move vertically and can rotate about a transverse axis to point forwardly, downwardly or rearwardly. The horizontal beam carries spray nozzles. The system uses sensors carried on the carriage to detect the position of the vehicle and to generate a stored matrix defining the shape. A control unit in response to the matrix moves the carriage and vertically movable element to the required position to spray the front, top and rear of the vehicle. Each spray nozzle comprises a central hub rotatable on a shaft with a pair of wand arms extending radially of the hub with spray nozzles projecting parallel to an axis of the hub so that the wands rotate about the axis.

9 Claims, 7 Drawing Sheets

APPARATUS FOR WASHING VEHICLES

BACKGROUND OF THE INVENTION

This invention relates to an apparatus for washing vehicles and is particularly but not exclusively designed for washing large vehicles such as road transport trucks.

It is well known that the regular washing of vehicles is highly desirable not only to maintain an attractive appearance but also to maintain effective working condition of the vehicle. Many operators of trucks and similar vehicles therefore set up a bay in which the trucks can be washed. This enables the trucks from that company to present an attractive appearance on the road to maintain the image of the trucking company and also to ensure proper and effective maintenance of paint work and moving parts.

Bays for washing cars and buses can be relatively straightforward in operation and control since the dimensions of the vehicle are relatively standard. Many of the older type washing systems use rotating cylindrical brushes and simple low pressure spray nozzles and these are controlled by a float system so that the contact with the vehicle itself causes the axle of the cylindrical brush to move the required position to maintain the bristles of the brush in contact with the vehicle under the required pressure.

More recently it has become more desirable to wash vehicles using high pressure spray nozzles. The spray nozzles have the advantage that they can effect cleaning action at positions which cannot be directly contacted with the conventional brush and since the spray nozzles avoid the direct physical contact with the brush which can be damaging to paint work and movable elements on the vehicle.

Spray nozzles are most effective at a predetermined distance of eighteen inches from the vehicle surface. They can however act at greater distances but there is of course a limit on the effective distance from the vehicle surface. In relation to vehicles of a relatively fixed length such as automobiles and buses, this can be accommodated. Ryko Manufacturing Co. of Grimes IA disclose a washing device of this type for trucks with the ability to wash the front, rear and top surfaces of the truck. The device is shown in their brochure AS90 SATURN which shows an arrangement which uses a manual input to enter the approximate length and height due to the widely different dimensions of vehicles to be washed. The device then treats the vehicle as a rectangular box of the height and length dimensions entered so that the washing action is relatively inefficient in that the nozzles are not maintained at the required distance from the surface of the vehicle. The device has side nozzles which wash the sides and a top boom which can move up and down and can rotate to wash front, rear and top surfaces.

One arrangement for washing vehicles which uses sensors to attempt to keep high pressure nozzles within required distances of the surface of a vehicle is shown in U.S. Pat. Nos. 5,016,622 and 4,865,058 of Crotts et al. However this uses a simple pivoting arm arrangement with one arm at a front and a second at a rear, both mounted on a moving gantry, the arms themselves carry sensors so that the arm is prevented from moving too close to the vehicle surface. This pivotal movement and relatively crude control does not allow the close control of the nozzles necessary for optimum efficiency. In addition, the device has achieved little commercial success, it is believed because the control system will be ineffective in the harsh environment of the high pressure nozzles.

SUMMARY OF THE INVENTION

It is one object of the present invention, therefore, to provide an apparatus for washing vehicles which can accommodate vehicles of different dimensions and provides close control over the movement of the nozzles to obtain effective cleaning action.

According to the invention, therefore, there is provided an apparatus for washing vehicles comprising: a vehicle receiving station into which a vehicle can be moved longitudinally to a wash position therein; a carriage having a carriage support and drive arrangement mounting the carriage for movement longitudinal of the vehicle in the wash position; a plurality of high pressure spray nozzles mounted on the carriage for non-contact cleaning of the vehicle by high pressure fluid; a support member carried by the carriage for longitudinal movement therewith and movable relative to the carriage in a direction transversely of the vehicle, at least some of the spray nozzles being mounted on the support member for movement therewith; scanning means mounted on the carriage for movement therewith for detecting a side profile of the vehicle, the scanning means being arranged to detect the side profile in a first pass of the carriage along the vehicle; means for storing the side profile; and means for moving the carriage and the support member in at least one subsequent pass over the vehicle to effect washing of the vehicle, movement of the support member relative to carriage being controlled in dependence on the stored side profile.

Preferably the scanning means comprises an array of stationary sensors mounted on the carriage for movement therewith.

Preferably the array includes a vertical series of vertically spaced sensors each respective sensor being responsive to the presence of an element of the vehicle aligned with the respective sensor and wherein the scanning means includes means for detecting positions of the carriage longitudinally of the vehicle for generating a matrix of the positions of the carriage and the state of the sensors at those positions.

Preferably each sensor comprises a light source on one side of the carriage and a light detector on an opposed side of the carriage aligned with the light source whereby the outline of the vehicle is detected by light beams between the light sources and the detectors.

Preferably there is provided a first set of spray nozzles mounted on the carriage for movement therewith, the first set being mounted on a pair of depending side members each arranged on the respective side of the vehicle with the spray nozzles thereon arranged for spraying inwardly toward a side of the vehicle and wherein there is provided a second set of nozzles mounted on the support member for movement therewith.

Preferably the support member includes a horizontal beam carrying a plurality of spray nozzles thereon, the beam being movable vertically relative to the carriage and wherein the beam is rotatable about a horizontal axis transverse to the longitudinal direction of the vehicle from a first position supporting the spray nozzles to spray horizontally forwardly to a second position turned through 90° from the first position supporting the spray nozzles for spraying vertically downwardly and to a third position turned 90° from a second position for supporting the spray nozzles to spray horizontally rearwardly.

Preferably the carriage includes means for generating high pressure flow of cleaning fluid and means for generating a low pressure flow of cleaning fluid and wherein the scanning means is arranged to detect the surface of the vehicle during a period only the low pressure flow is generated.

Preferably the support member is maintained in a fixed raised position relative to the carriage as the carriage is moved between a front end and a rear end of the vehicle while the scanning means is operated.

Preferably the array is arranged forwardly of the support member for detecting an end surface of the vehicle in advance of the support member reaching the end surface and wherein the carriage is maintained stationary while the support member is moved for washing the end surface.

Preferably there is provided manual input means for inputting information as to whether the vehicle to be cleaned is loaded or unloaded and control means arranged such that the second set of nozzles on the support member are closed during passage of the support member over a top of the vehicle if the vehicle is loaded.

Preferably the first set includes vertically spaced subsets of the nozzles and wherein at least one of the subsets is closed in response to detection of a height of the side profile which different from the height of the subset.

Preferably there is provided means for supplying an acid presoak fluid and an alkali presoak fluid and manual input means for inputting information for selecting one of the acid and alkali presoak fluids.

According to a second aspect of the invention there is provided an apparatus for washing vehicles comprising: a vehicle receiving station into which a vehicle can be moved longitudinally to a wash position therein; a carriage having a carriage support and drive arrangement mounting the carriage for movement longitudinal of the vehicle in the wash position; a plurality of high pressure spray nozzles mounted on the carriage for non-contact cleaning of the vehicle by high pressure fluid; a horizontal support member carried by the carriage for longitudinal movement therewith and vertically movable relative to the carriage and the vehicle, at least some of the spray nozzles being mounted on the support member for movement therewith; a first set of spray nozzles mounted on the carriage for movement therewith, the first set being mounted on a pair of depending side members each arranged on the respective side of the vehicle with the spray nozzles thereon arranged for spraying inwardly toward a side of the vehicle; a second set of nozzles mounted on the support member for movement therewith and arranged to spray toward front, top and rear surfaces of the vehicle; and means for closing the flow of cleaning fluid to the second set of spray nozzles so as to avoid washing the top of a loaded cargo vehicle.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

The washing assembly for trucks and similar vehicles shown in the Figures includes a building structure (not shown) which is of sufficient length, width and height to define a bay inside the building with overhead doors at front and rear ends of the bay. Within the bay is defined a vehicle washing station within which the vehicle can be located for washing by the assembly shown in the Figures.

Figure 1:
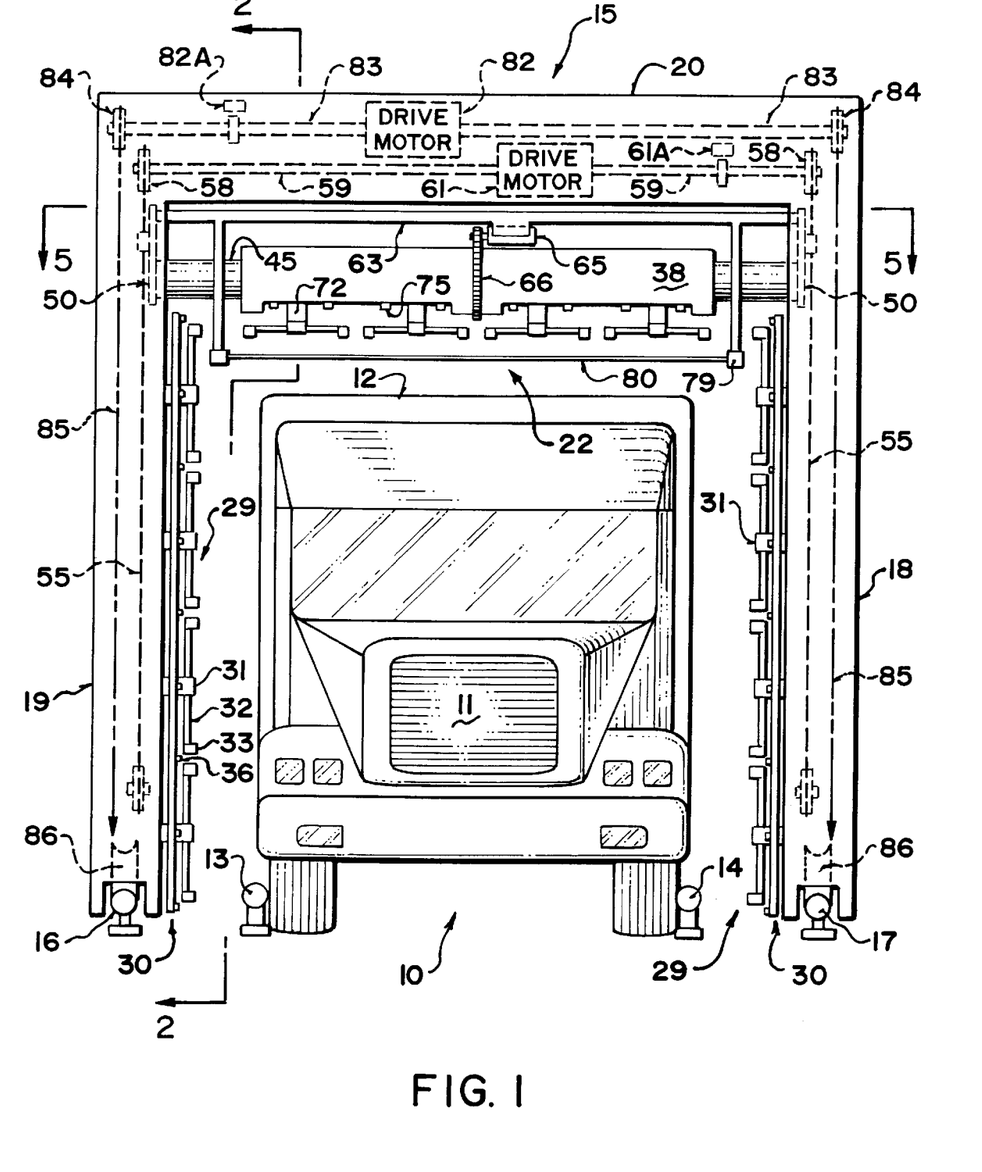
FIG. 1 is a front elevational view of a washing bay for washing trucks including the apparatus of the present invention.
Figure 5:
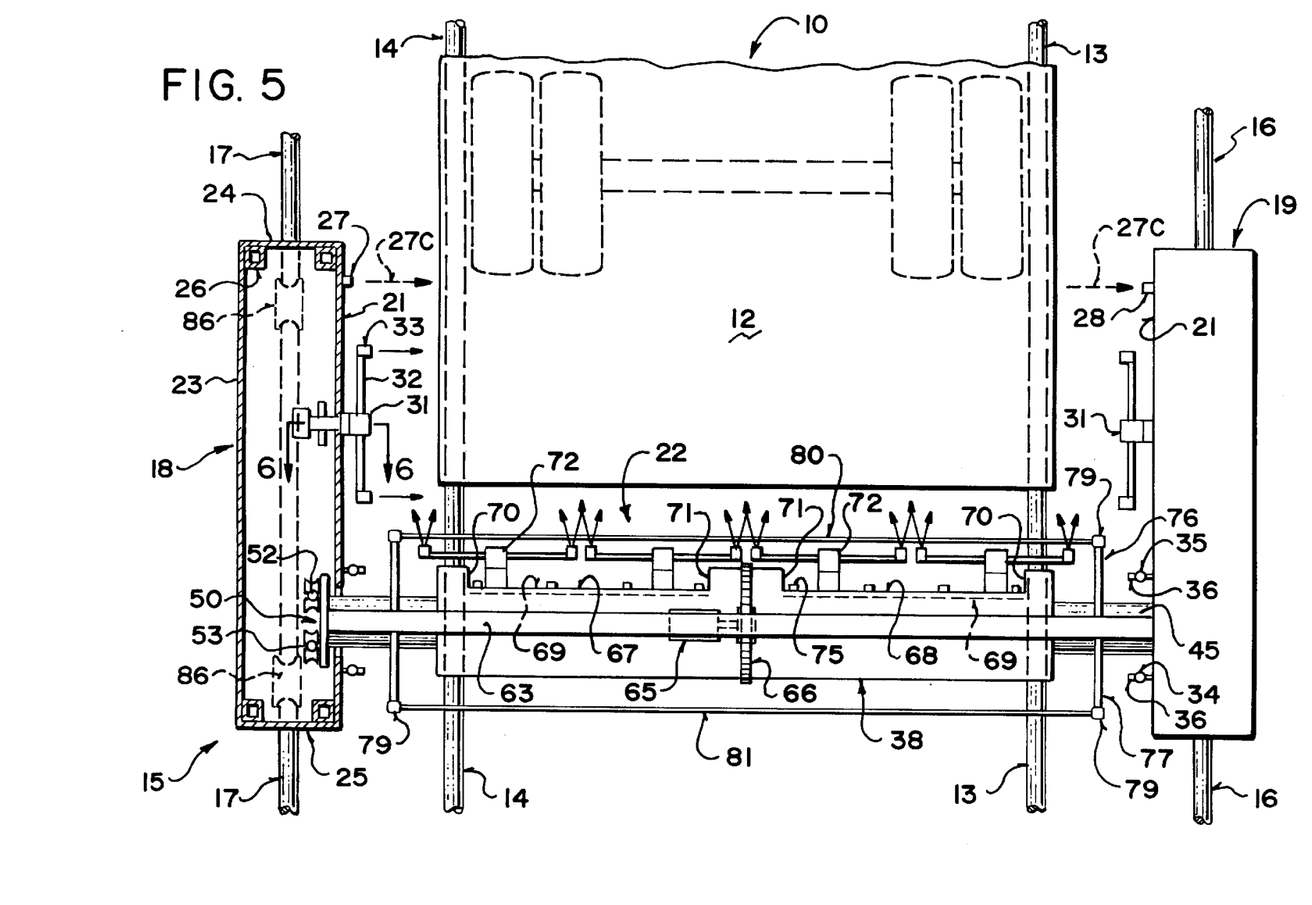
FIG. 5 is a cross-sectional view along the lines 5—5 of FIG. 1.

Referring firstly to FIGS. 1 and 5, the truck is generally indicated at 10 located within the building for washing of the truck including a tractor 11 and a trailer 12. The side to side position of the vehicle within the bay is defined by two rails 13 and 14 each mounted on the ground or the floor of the bay with the rails being spaced by the width of the vehicle and arranged longitudinally of the bay.

Within the bay is mounted a moving gantry 15 which can run along the length of the bay on rails 16 and 17 mounted on the floor parallel to and spaced outwardly from the rails 13 and 14.

The gantry 15 includes two vertical side portions 18 and 19 together with a horizontal top connecting portion 20 providing structural interconnection between the vertical portions to define a generally rectangular arrangement with a hollow or open area inside the rectangular gantry allowing the gantry to pass over the vehicle 10 in the washing action. The rails 16 and 17 extend along the full length of the bay so the gantry can move from a position forwardly of the forward end of the tractor as shown in FIG. 1 to a position rearwardly of a rear end of the trailer as shown in FIG. 5.

The vertical side portions 18 and 19 are of fixed spacing which is arranged to be greater than the maximum allowable width of eight feet of the vehicle so that the inside surfaces 21 of the vertical sides 18 and 19 are spaced from the sides of the vehicle by a distance sufficient to receive the spray nozzles described hereinafter.

The gantry further carries a vertically moveable spray assembly generally indicated at 22 which can move vertically upwardly and downwardly between the two vertical sections 18 and 19. The spray assembly 22 is also rotatable about a longitudinal axis of the spray assembly between three different positions in which the spray nozzle thereon sprays forwardly, downwardly or rearwardly as required.

Figure 2:
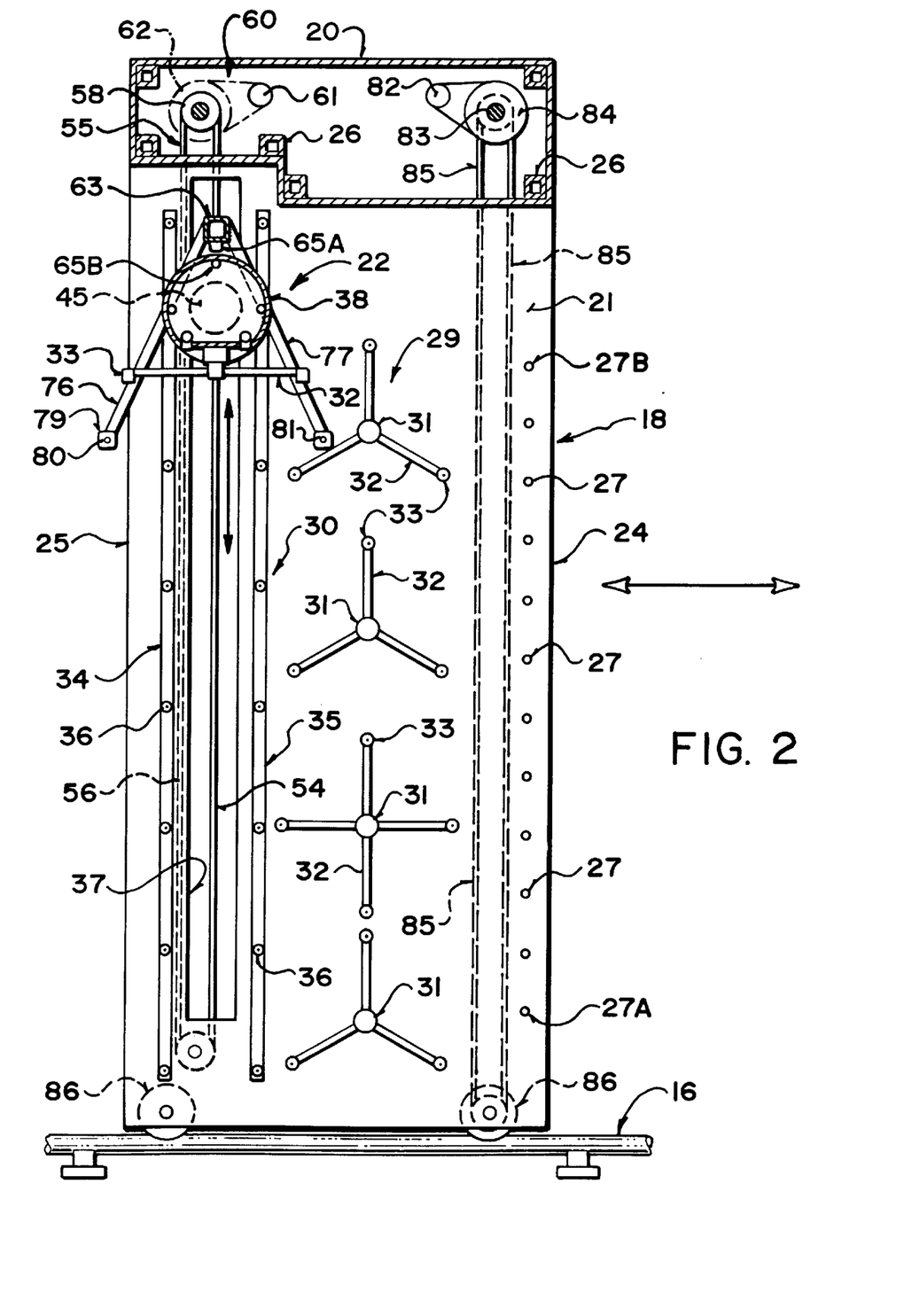
FIG. 2 is a cross-sectional view along the lines 2—2 of FIG. 1.

Turning now to FIGS. 2 and 5, the arrangement of one of the vertical sections 18 is shown. It will be appreciated that the opposite one 19 of the vertical sections forms substantially a mirror image of the section 18 shown particularly in FIG. 2.

The vertical section 18 thus comprises a rectangular housing having the front face 21, a rear face 23, side faces 24 and 25, all of which are formed by sheet metal panels mounted on a frame structure defined by tubular members 26. Similarly the connecting structure 20 is formed from sheet metal panels and similar tubular frame members 26.

The front panel 21 thus forms a rectangular front face facing the side of the vehicle to be washed. The front face 21 carries a row of transmitters 27 arranged adjacent one side edge of the front face. The transmitters 27 are equidistantly spaced in the row from a lowermost one 27A spaced partly upwardly from the bottom edge to an uppermost one 27B which is arranged at a height equal to or above the maximum height of the expected vehicles to be washed.

On the opposite side section 19 is provided a similar row or array of receivers 28. The row 28 is arranged to be exactly symmetrical to the row 27 so that each transmitter 27 has an associated receiver 28 at the same height. The beam of light 27C from the transmitter 27 is arranged to have an angle of transmission so that it can be received by only a single one of the receivers 28. Alternatively the transmitters and receivers may be arranged in pairs for receiving light transmission at different frequencies. Using either technique, the transmitters and receivers are thus arranged in pairs so that each receiver is responsive to light only from its associated transmitter and emits a signal when light is received and emits no signal when light is blocked by the presence of a part of the vehicle therebetween.

The front face 21 further carries a first set of spray nozzles generally indicated at 29 and a second set of spray nozzles generally indicated at 30.

The first set of spray nozzles are rotatable and comprise four hubs 31 at vertically spaced positions in a row vertically of the front face. Each hub 31 is rotatable about a horizontal axis at right angles to the front face 21 and each hub carries a plurality of radially extending wand arms 32 each having a nozzle 33 at its outer end. The nozzles are arranged to project washing liquid forwardly from the front face generally at right angles to the front face.

The second set of nozzles comprises a pair of vertical pipes 34 and 35 which are spaced horizontally and arranged to one side of the first set of nozzles 29 which is opposite to the transmitters 27. Each of the pipes 34 and 35 carries a plurality of vertically spaced jet nozzles 36.

The first set of spray nozzles 29 is arranged for a high pressure washing action. The second set of spray nozzles 30 is arranged for low pressure washing action. Thus the nozzles are selected so that they generate an effective spray pattern in response to the quantity and pressure of washing fluid necessary for the high pressure and low pressure washing actions respectively.

Each high pressure spray assembly (see FIG. 6) comprises the hub member 64 and two, three or four wands 32 which extend radially outwardly from the hub. At the outer end of each of wand is provided the spray nozzle 33. The spray nozzle thus directs spray generally in a direction which is parallel to an axis 31A of the hub 31. The hub has a hollow interior for receiving high pressure liquid and communicating that liquid to the nozzles 33. The two spray nozzles of each assembly are therefore parallel and spaced on either side of the central axis 31A of the assembly.

Figure 6:
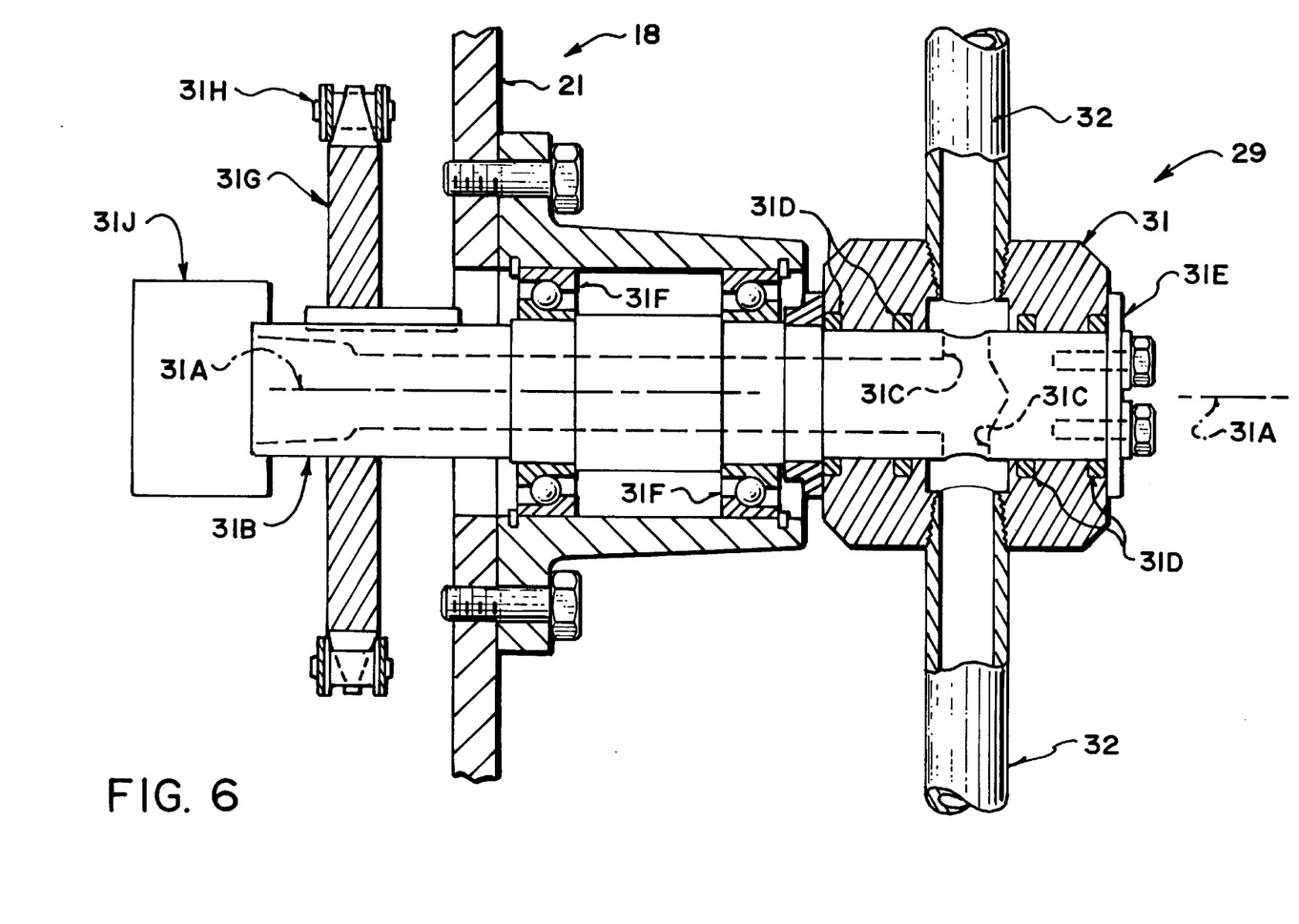
FIG. 6 is a cross-sectional view on an enlarged scale of one spray hub taken along the lines 6—6 of FIG. 5.

The hub 31 is mounted on an exposed end of a shaft 31B which is hollow so as to communicate high pressure liquid to the interior of the hub 31, the shaft having a plurality of radial holes 31C allowing the liquid to escape outwardly into the interior of the hub. The hub is a press fit onto the shaft with two pairs of sealing rings 31D, each pair arranged on a respective side of the radial holes to prevent the axial escape of liquid while holding the hub in contact with the shaft. The hub is held in place by an end cap 31E but can however be simply pulled from the shaft for replacement after removal of the end cap and can, if contacted by a fixed object, cease rotation while the shaft continues to rotate about the axis 31A. The shaft is mounted in bearings 31F mounted on the outside surface of the wall 21 and projects through a hole in the wall into the interior of the vertical portion 18. The shaft carries a sprocket 31G which is fixed to the shaft for communicating rotational movement to the shaft through a drive chain 31H. At the rear end of the shaft is provided a coupling 31J which communicates the high pressure liquid to the interior of the shaft without liquid being received from a supply hose from a central supply source.

The shafts 31B of the four assemblies 63 are thus parallel and each supported on the inside wall 21. Each sprocket is in communication with the drive chain so that all of the shafts are rotated each about its respective axis at a common rotational speed. The chains are driven by a hydraulic motor mounted at a suitable location.

The assemblies 63 thus face toward the sides of the vehicle as the carriage is moved along the rails 16 and 17. The diameter of each assembly is arranged so that they act together to cover the whole extent of the side of the vehicle from a position at or closely adjacent the ground surface to a position at the top of the maximum height vehicle allowable within the washing area. The rotation of the assemblies hubs 31 ensures that the full area of the side of the vehicle is covered in a sweeping action by each of the jet nozzles 33.

The front plate 21 includes a slot 37 extending vertically and arranged between the pipes 34 and 35. The slot extends substantially the full height of the plate 21 and receives the horizontal spray assembly 22 for vertical movement upwardly and downwardly relative to the plate 21.

The horizontal spray assembly 22 comprises a central cylindrical portion 38 which carries a plurality of spray nozzles including a first spray assembly 39 and a second spray assembly 40.

The central cylindrical member 38 includes a plurality of coupling plates 42 at spaced positions along the length of the cylindrical member which extend from the inside surface of the cylindrical member to a support pipe 43 carried inside the cylindrical member and rotatable therewith about a central axis 44 of the cylindrical member. The central pipe 43 has ends which project outwardly beyond ends of the cylindrical member into a pair of supporting stub shafts 45 each carried on a respective one of the side portions 18 and 19. Inside each stub shaft 45 is provided a central core shaft 46 which carries on its outer surface a bearing 47 so that the inside of the tube 43 is carried on the outside of the shaft 46 for rotation relative thereto.

Figure 3:
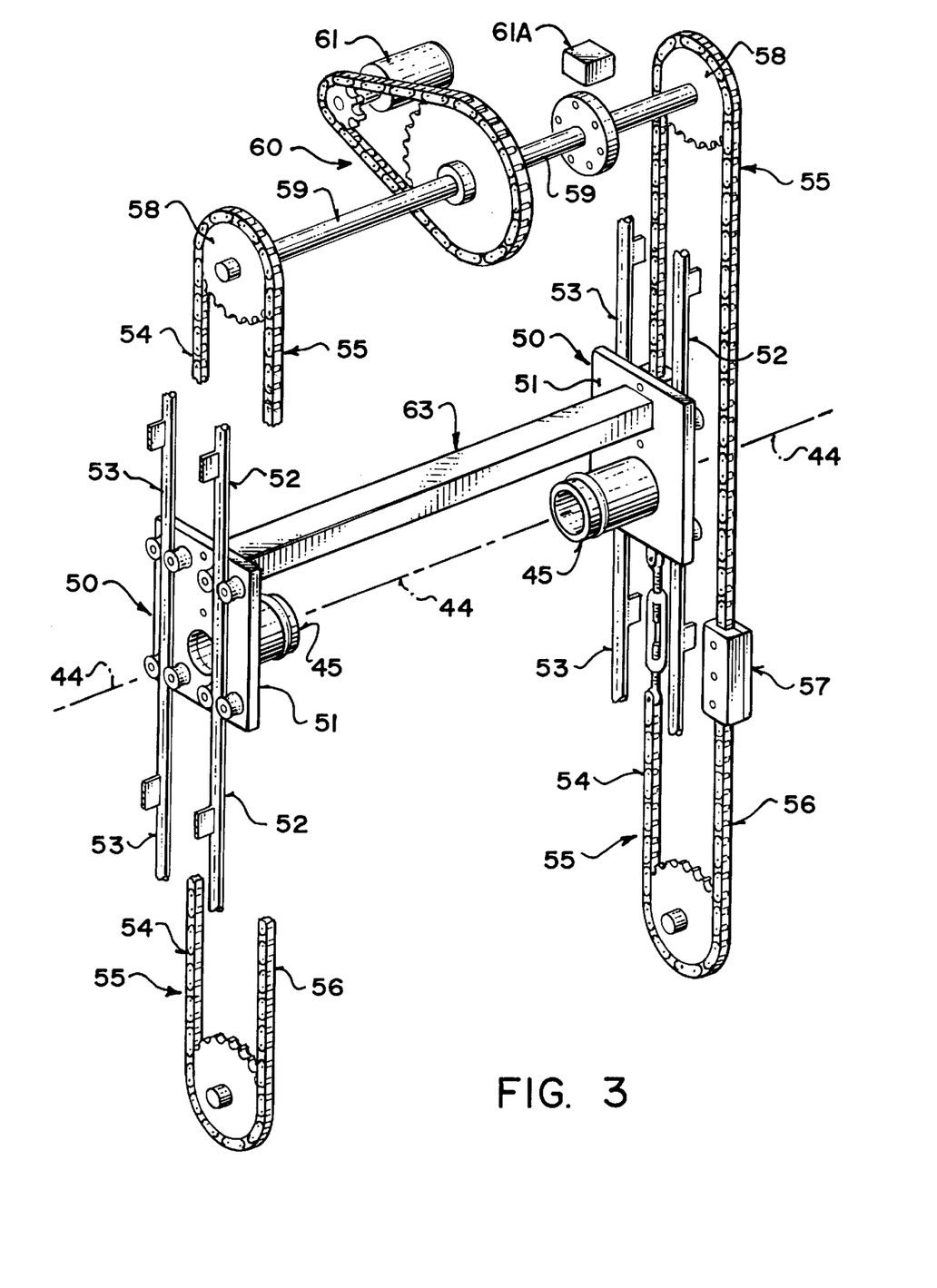
FIG. 3 is schematic illustration of the drive system to the boom of the washing bay of FIG. 1.

Turning now to FIG. 3, it will be noted that each of the stub shafts 45 is carried on a respective one of a pair of carriages 50 each mounted within a respective one of the side portions 18 and 19. Thus each carriage 50 comprises a base plate 51 at right angles to the axis 44 with the stub shaft 45 projecting outwardly therefrom through the slot 37. The outside surface of the plate 51 is carried on a pair of parallel rails 52 and 53 mounted in fixed position inside the interior of the respective side portion 18, 19. The plate 51 carries two sets of pulleys which run on the outside surface of the rails 52, 53 to guide the plate 51 in vertical movement along the slot. The plate 51 is attached to one run 54 of a chain. The opposite run 56 of the chain carries a counterweight 57 which has sufficient mass so that, in the absence of any drive to the chain, the counterweight pulls the horizontal spray assembly 22 vertically upwardly to the top of the gantry.

The chains 55 are mounted on a pair of sprockets 58 carried on a shaft 59 driven by a hydraulic drive assembly 60. The drive assembly 60 includes a motor 61 and a sprocket 62 mounted on the shaft 59. This actuation of the motor 61 causes vertical driving movement of the horizontal spray assembly 22 and a position of the horizontal spray assembly can be adjusted by controlling actuation of the motor 61.

The carriages 50 are also connected by a horizontal crossbeam 63 which is located above the cylindrical portion and parallel thereto. The beam 63 carries a bracket 64 at a position approximately midway along its length. On the bracket 64 is carried a hydraulic motor 65 with a sprocket driving a chain 66 which is wrapped around the cylindrical outside surface of the cylindrical portion 38 and is attached thereto so the rotation of the sprocket drives the chain 66 and causes rotation of the cylindrical member 38 about its axis 44.

Figure 4:
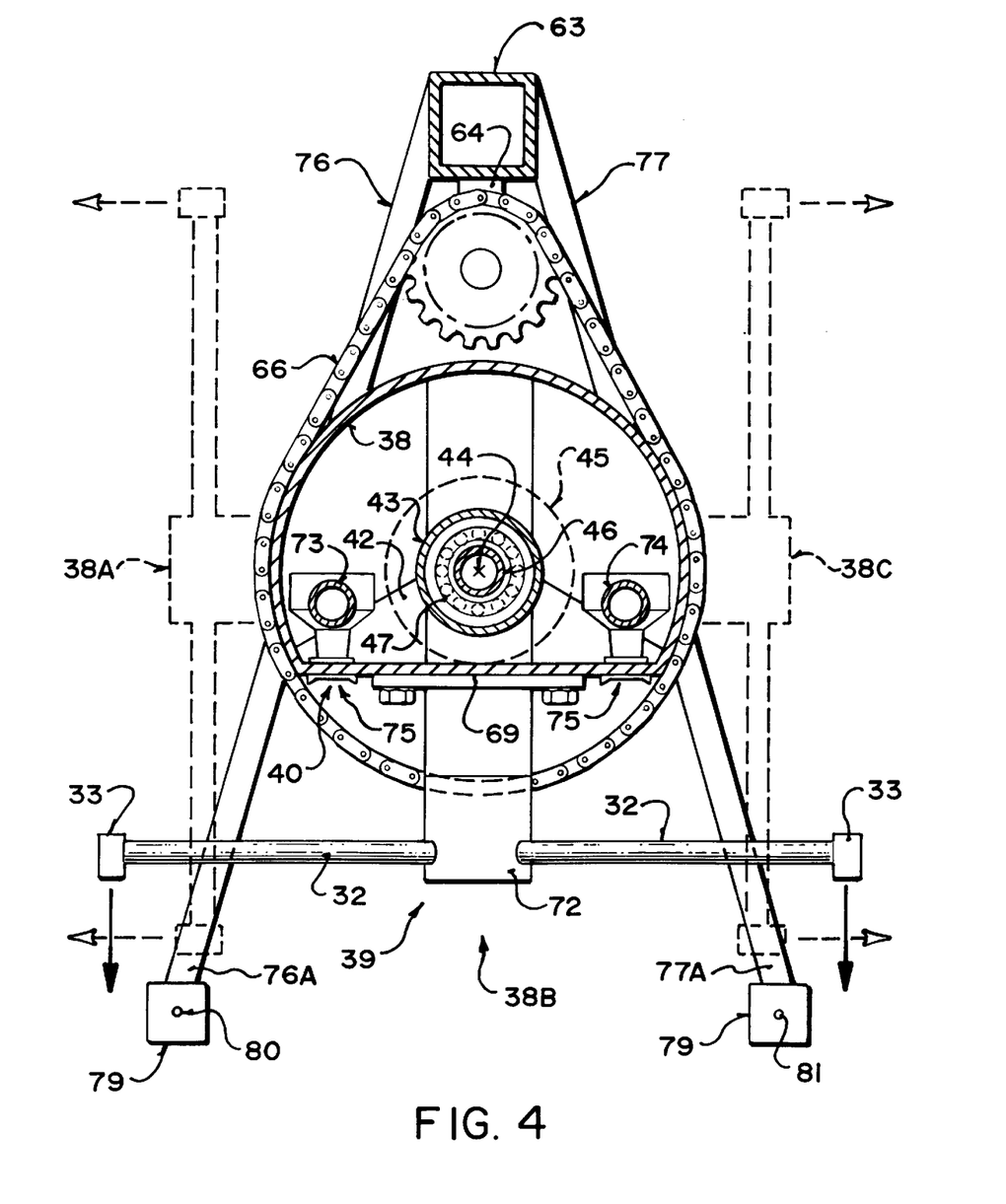
FIG. 4 is one part only showing the boom in more detail of the cross-section of FIG. 2.

Thus the cylindrical member 38 can be moved between three positions shown best in FIG. 4 and indicated at 38A, 38B and 38C.

The cylindrical member 38 includes two cutout portions 67 and 68 each of which is defined by a plate 69 lying across a chord of the circle defining the cross-section of the cylindrical member 38. Thus each cutout 67, 68 extends from an end 70 to a second end 71. The end 70 is arranged closely adjacent the respective end of the cylindrical portion. The end 71 is arranged adjacent to but spaced from the midpoint of the cylindrical portion at which the chain 66 is located.

Each of the base plates 69 carries elements of the first spray assembly 39 and the second spray assembly 40. Thus the first spray assembly 39 of each of the cutouts comprises two hubs 72 substantially identical in construction to the hubs 31 previously described. Thus each of the hubs 72 carries similar wands 32 and spray nozzles 33. Each hub thus defines an axis of rotation at right angles to the base plate 69.

The second spray assembly which is for low pressure washing comprises a pair of pipes 73 and 74 each arranged on the base plate on a respective side of the hubs 72 with the pipes 73 and 74 extending longitudinally of the cylindrical member 38 and carrying a plurality of low pressure spray nozzles 75 similar to the nozzles 36 of the pipes 34 and 35.

The beam 63 also carries at each end a pair of depending arms 76 and 77 which extend downwardly and outwardly from the beam each on a respective side of the stub shafts 45. Thus a lower end 76A, 77A of each of the arms is positioned outwardly of and downwardly of the cylindrical member 38. At each bottom end of the arms is attached a wire coupling assembly 79 so that two wires span the area between the lower ends of the arms. Thus at the lower end of each arm 76 is attached the wire 80 by way of the wire coupling elements 79 and similarly the wire 81 spans the area between the lower ends of the arms 77. The wire coupling elements 79 simply comprise a mounting of the wire at one end and an electrical connection and spring mounting at the other end which allows the wire to pulled slightly by engagement with an object whereupon any further deviation of the wire causes the electrical connection to be closed giving a signal indicative of the engagement of the wire with the object.

The wires thus form a fail-safe detector system for ensuring that the horizontal spray assembly 22 can not engage any portion of the vehicle without providing an electrical indication which can shut down the drive to the system.

Movement of the gantry along the rails 16 and 17 is effected by a drive system including a drive motor 82 with a shaft 83 communicating drive via a pulley 84 and chain 85 to one of a pair of or both of a pair of mounting wheels 86 supporting the side portion of the gantry on the respective rails 16, 17.

Figure 7:
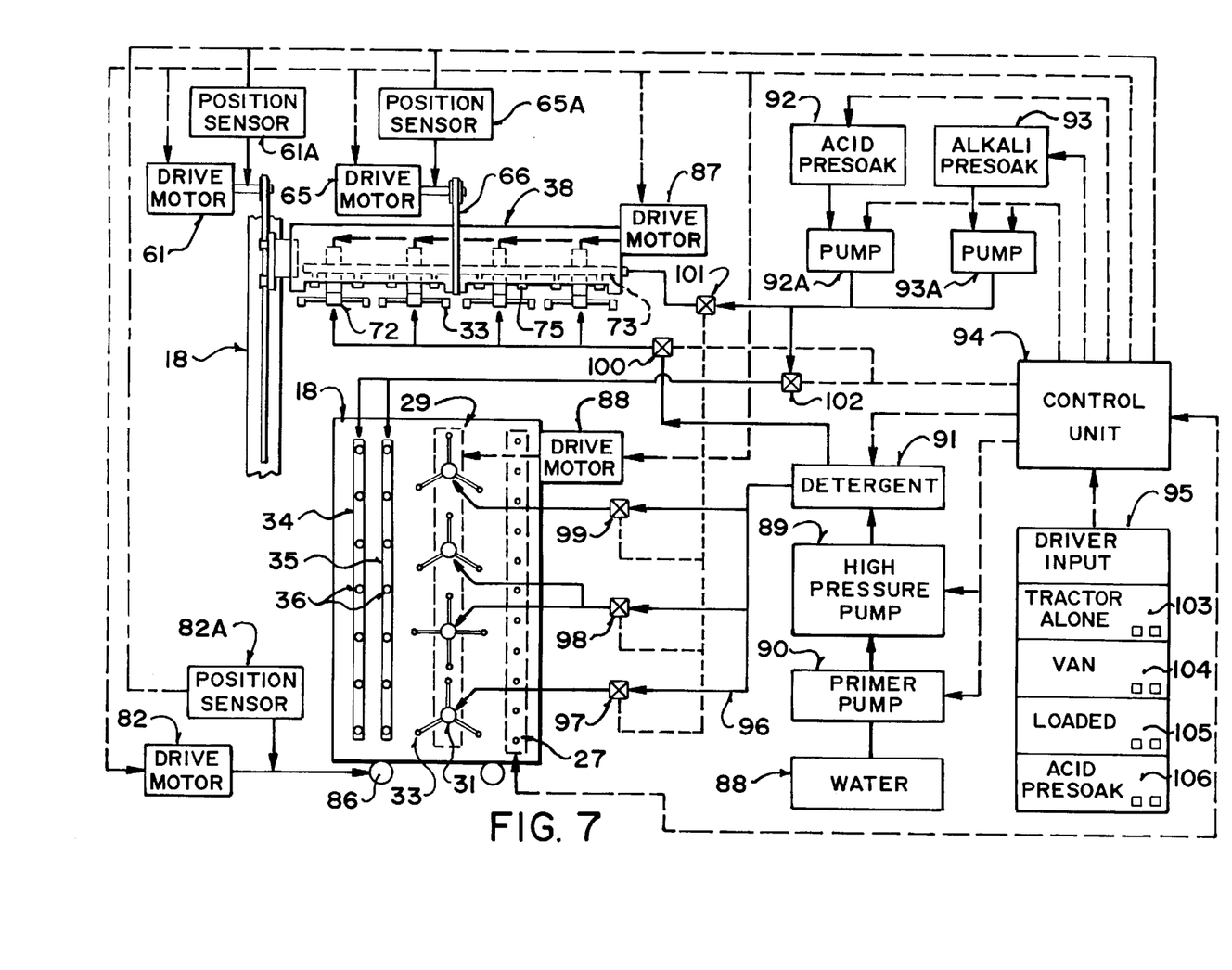
FIG. 7 is a schematic layout of the plumbing system and control system of the washing bay of FIG. 1.

Turning now to FIG. 7 there is shown a control system for the various elements of the gantry including for controlling the drive motors 62, 65 and 82 previously described. In addition the system includes drive motors 87 and 88 which are provided to drive the rotation of the hubs 72 and 31 respectively.

Further the system includes a supply of water 88, a high pressure pump 89, a primer pump 90, a supply of detergent 91, a supply of acid pre-soak material 92 with an associated low pressure pump 92A, a supply of alkali pre-soak material 93 with an associated low pressure pump 93A, a control unit 94 and a manually operable driver input unit 95. The control unit 94 controls actuation of the high pressure pump 89 which supplies water through the detergent supply system 91 to a plurality of output lines 96 which communicate through valves 97, 98, 99 and 100 to the hubs 31 and 75. The primer pump feeding the high pressure pump prevents cavitation.

As it will be noted that the valve 97 controls supply of washing fluid to the lowermost hub 31 on each of the side portions of the gantry. The valve 98 controls supply of washing fluid to the second and third hubs of the side portions and the valve 99 controls supply of fluid to the uppermost hub on the side portions. The valve 100 controls supply of fluid to all of the hubs at 72 simultaneously.

The detergent supply 91 can be actuated or shut off by the control unit 94 so that the water supplied by the high pressure pump can be supplemented by detergent or free from the detergent.

The low pressure system receives either acid pre-soak material from supply 92 and pump 92A or alkali pre-soak material from supply 93 and pump 93A, under control from the control unit 94. The low pressure pumps 92A or 93A discharge the selected pre-soak material along output lines through valves 101 and 102. The valve 101 controls the supply of the pre-soak material to the pipes 73 and 74 of the horizontal spray assembly 22. The valve 102 controls the supply of the pre-soak material to the pipes 34 and 35 of both of the side portions.

The driver input device 95 includes a plurality of selectable switches 103, 104, 105 and 106. The selectable switches provide alternative inputs for the driver to select. The switches 103 provide selection by the driver to indicate to the system whether the driver wishes to wash a highway tractor alone or a highway tractor attached to a semitrailer. The second switch 104 requires the driver to select whether the vehicle to be washed is a van or a semitrailer. Switch 105 requires the driver to select whether the vehicle is loaded or is unloaded. Switch 106 requires the driver to select whether the pre-soak material should be and acid material or an alkali material.

Position detection for controlling the location of the gantry and the horizontal support is provided by position sensors 61A, 65A and 82A respectively associated with the motors 61, 65 and 82. Each position sensor comprises a wheel carried on the output shaft of the respective motor for rotation with the shaft, which wheel carries a plurality of angularly spaced magnets which actuate a proximity switch to generate a pulse for each portion of rotation of the wheel. Thus the position of the carriage is defined by counting pulses of the sensor 82A from one end stop of the movement of the carriage with each pulse representing a distance of movement of the carriage which in one practical example is 2.5 inches. In addition the position of the horizontal support is defined by counting pulses of the sensor 61A from an uppermost position of the support located against end stops at the upper end of the carriage. The orientation of the support about its longitudinal axis is detected by the position sensor 65A which cooperates with magnets 65B carried on the shaft or (as shown) on the outside of the cylindrical body of the support.

In operation, the driver and vehicle approach the building within which the gantry and washing system are located. At the outside of the entrance door the manual unit 95 is provided for access by the driver. The manual unit 95 includes (not shown) systems for providing identification of the driver and either payment or entrance of an identification code so that the necessary monetary considerations can be dealt with. On completing the identification or monetary issues, the driver manually selects the switches 103 through 106 so as to provide information to the control unit as to the type of wash to be effected.

On completion of input of information, the entrance door is opened and the vehicle is driven into the bay. At the time of entrance, the gantry is located at the entrance door so that the vehicle drives through the gantry and takes up a position forwardly of the gantry at a point where the vehicle is required to stop as indicated by the control system.

With the vehicle stopped in the required location, the system is initialized by the control unit causing driving of the gantry and the support on the gantry to the end stops and setting the counted pulses at those locations as position "one". The support is rotated back and forth between end stops and the initial position is defined as the intermediate or horizontal position. The gantry is then moved forwardly toward the vehicle, thus approaching the rear end of the vehicle. The detection array including the transmitters 27 continually transmits the beams across the area between the gantry. In the absence of the rear of the vehicle, the beams are all unbroken indicating to the control unit 94 that the rear of the vehicle has not yet been reached. It will be noted that the transmitters 27 are at the front edge of the side portions so that transmitters and receivers will encounter the vehicle immediately the gantry reaches the rear of the vehicle. On reaching the rear of the vehicle, as detected by the transmitter/receiver system, the forward movement of the gantry is continued for a short period of time until the horizontal spray assembly 22 is located immediately rearwardly of the vehicle. At this time the gantry is halted from further forward movement and the horizontal spray assembly is rotated to the position 38C (FIG. 4) so the spray nozzles project forwardly. The horizontal spray assembly is then moved downwardly to its bottom position by counting the pulses from the sensor 61A.

At this bottom position the low pressure pump 90 is actuated with the selected one of the pre-soak materials and the valve 101 is actuated to supply the pre-soak materials to the nozzle 75. The drive motor 62 is actuated to drive the horizontal spray assembly vertically upwardly from its lower position to its upper position while the spray nozzle continues to spray forwardly to direct the pre-soak materials onto the rear surface of the vehicle.

On reaching the upper position the drive motor 65 is actuated to rotate the horizontal spray assembly to the position 38B with the nozzles projecting vertically downwardly.

With the horizontal spray assembly moved to the raised position, the movement of the gantry is recommenced and the gantry thus moves along the vehicle from the rearward end to the forward end. During the forward movement of the gantry along the length of the vehicle, the transmitter/receiver arrangements monitor a pattern of the shape of the vehicle by storing information concerning those receivers which are receiving the associated beam and those which are blocked.

The information from the array of transmitter/receivers is associated with an array of positions longitudinally of the vehicle to develop in the control unit 94 a matrix having as a horizontal axis the horizontal position and having as a vertical axis those transmitter/receivers which are blocked. This matrix thus defines the shape of the vehicle in side elevation including the shape of an upper surface, the shape of a lower surface and the location of any vertical lines including both the front and rear lines and any intervening lines.

During the scanning process, the spray nozzles 36 are actuated by operation the valve 102. Thus the selected pre-soak material is applied to the side surfaces of the vehicle. The detection and pre-soaking can be carried simultaneously since the liquid from the pre-soak material is of relatively low pressure and volume and thus does not interfere with the optical transmission between the transmitters and receivers.

In the event that the vehicle is unloaded, as selected on the input 95, the washing arrangement is selected by the control unit 94 to effect the washing of the horizontal top surface of the vehicle. In the event that the vehicle is loaded, the washing cycle can be arranged so that the upper surface of the vehicle is not washed neither with pre-soak nor with subsequent washing materials as described hereinafter. In the event that the upper surface of the vehicle is not to be washed in the loaded condition the respective valves supplying the washing material to the nozzles of the horizontal spray assembly are closed off during the time that the horizontal spray assembly is in the position 38B for washing the horizontal top surface.

On reaching the front of the vehicle as detected by the transmitter/receiver arrangements detecting a condition in which all of the beams are intact, the gantry is moved forwardly by a distance sufficient to clear the horizontal spray assembly just beyond the front face of the vehicle following which the motor 65 is actuated to rotate the horizontal spray assembly to the position 38A and the motor 62 is actuated to drive the horizontal spray assembly downwardly to continue spraying the front surface of the vehicle.

Thus in the initial movement of the gantry, the device effects the pre-soaking action but assumes during the pre-soaking action that the vehicle is simply rectangular so there is no vertical movement of the horizontal spray assembly in the initial action to follow the upper surface of the vehicle.

After a period of time sufficient to allow the pre-soak material to effect a pre-soaking action on the surfaces of the vehicle, the movement of the gantry is reversed during a detergent application cycle.

Thus the valves 102 and 103 are closed and the low pressure pump is switched off. The control unit then actuates the high pressure pump and the detergent supply system so that high pressure detergent is supplied through the high pressure lines to the valves 97, 98, 99 and 100.

In the first step the gantry is maintained stationary while the detergent is supplied to the hubs 72 of the horizontal spray assembly with the horizontal spray assembly moved to the position 38A. Thus the front of the vehicle is washed by vertical movement of the horizontal spray assembly and by rotation of the hubs driven by the drive motor 87.

When the front of the vehicle is washed, the control unit actuates rearward movement of the gantry and actuates vertical movement of the horizontal spray assembly and actuates rotation of the horizontal spray assembly to take up the position 38B.

The vertical movement of the horizontal spray assembly is effected under control of the control unit is response to the matrix defining the side profile of the vehicle so that at each horizontal position along the length of the vehicle the horizontal spray assembly is moved to the required vertical position to be spaced slightly upwardly from the top surface of the vehicle.

The control unit thus controls the vertical movement of the horizontal spray assembly in accordance with the previously defined matrix so that the horizontal spray assembly is maintained at the required spaced position from the top surface of the vehicle to effect an efficient washing of the top surface.

At the same time, the hubs 31 are supplied with the detergent and are driven to effect washing of the sides of the vehicle.

On completion of the washing of the full periphery of the vehicle including the rear surface by following the pattern as set out in the matrix, the control unit actuates a further cycle of the system to effect rinsing of the surfaces using the high pressure pump while the detergent supply is deactivated.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. Apparatus for washing vehicles comprising:

a vehicle receiving station into which a vehicle can be moved longitudinally to a wash position therein;

a carriage having a carriage support and drive arrangement mounting the carriage for movement relative to the station longitudinal of the vehicle in the wash position, the station and carriage being arranged such that the station supports the vehicle in fixed stationary position during movement of the carriage and washing and such that movement necessary to effect the washing is carried out by the carriage;

a plurality of high pressure spray nozzles mounted on the carriage for non-contact cleaning of the vehicle by high pressure fluid;

a support member carried by the carriage for longitudinal movement therewith and movable in a direction upward and downward relative to the carriage and therefore relative to the vehicle, at least some of the spray nozzles being mounted on the support member for movement therewith;

means for detecting a series of positions of the carriage as it is moved longitudinally of the station with the vehicle stationary in the station;

scanning means mounted on the carriage for movement therewith for detecting at each of said series of positions a height of the vehicle;

computer control means having a memory for storing said positions and said heights so as to store information defining a side profile of the vehicle;

said computer control means being arranged to cause said carriage to move along the station in a first pass and to store said information from said first pass;

said computer control means being arranged to cause said carriage including the scanning means and the support member to move along the station in at least one subsequent pass over the vehicle to effect washing of the vehicle;

said computer control means being arranged to cause movement of the support member relative to carriage in said at least one subsequent pass over the vehicle in dependence on the stored side profile.

2. The apparatus according to claim 1 wherein the scanning means comprises vertical array of vertically spaced stationary sensors each respective sensor being responsive to the presence of an element of the vehicle aligned with the respective sensor.

3. The apparatus according to claim 1 including means for supplying an acid presoak fluid and an alkali presoak fluid and manual input means for inputting information for selecting one of the acid and alkali presoak fluids.

4. Apparatus for washing vehicles comprising:

a vehicle receiving station into which a vehicle can be moved longitudinally to a wash position therein;

a carriage having a carriage support and drive arrangement mounting the carriage for movement relative to the station longitudinal of the vehicle in the wash position, the station and carriage being arranged such that the station supports the vehicle in fixed stationary position during movement of the carriage and washing and such that movement necessary to effect the washing is carried out by the carriage;

a plurality of high pressure spray nozzles mounted on the carriage for non-contact cleaning of the vehicle by high pressure fluid;

a support member carried by the carriage for longitudinal movement therewith and movable in a direction upward and downward relative to the carriage and therefore relative to the vehicle, at least some of the spray nozzles being mounted on the support member for movement therewith;

means for detecting a series of positions of the carriage as it is moved longitudinally of the station with the vehicle stationary in the station;

scanning means mounted on the carriage for movement therewith for detecting at each of said series of positions a height of the vehicle;

computer control means having a memory for storing said positions and said heights so as to store information defining a side profile of the vehicle;

said computer control means being arranged to cause said carriage to move along the station in a first pass and to store said information from said first pass;

said computer control means being arranged to cause said carriage including the scanning means and the support member to move along the station in at least one subsequent pass over the vehicle to effect washing of the vehicle;

said computer control means being arranged to cause movement of the support member relative to carriage in said at least one subsequent pass over the vehicle in dependence on the stored side profile;

wherein there is provided a first pump operable by said control means for generating high pressure flow of cleaning fluid and a second pump operable by said control means for generating a low pressure flow of cleaning fluid, wherein the control means is arranged to stop the first pump when a high pressure flow of cleaning fluid is not required and to stop the second pump when a low pressure flow of cleaning fluid is not required and wherein the control means is arranged to actuate said scanning means during said first pass with said first pump stopped.

5. The apparatus according to claim 4 wherein the control means is arranged to actuate said scanning means during said first pass with said second pump means operating to generate said low pressure flow of cleaning fluid and said first pump stopped.

6. Apparatus for washing vehicles comprising:

a vehicle receiving station into which a vehicle can be moved longitudinally to a wash position therein;

a carriage having a carriage support and drive arrangement mounting the carriage for movement relative to the station longitudinal of the vehicle in the wash position, the station and carriage being arranged such that the station supports the vehicle in fixed stationary position during movement of the carriage and washing and such that movement necessary to effect the washing is carried out by the carriage;

a plurality of high pressure spray nozzles mounted on the carriage for non-contact cleaning of the vehicle by high pressure fluid;

a support member carried by the carriage for longitudinal movement therewith and movable in a direction upward and downward relative to the carriage and therefore relative to the vehicle, at least some of the spray nozzles being mounted on the support member for movement therewith;

means for detecting a series of positions of the carriage as it is moved longitudinally of the station with the vehicle stationary in the station;

scanning means mounted on the carriage for movement therewith for detecting at each of said series of positions a height of the vehicle;

computer control means having a memory for storing said positions and said heights so as to store information defining a side profile of the vehicle;

said computer control means being arranged to cause said carriage to move along the station in a first pass and to store said information from said first pass;

said computer control means being arranged to cause said carriage including the scanning means and the support member to move along the station in at least one subsequent pass over the vehicle to effect washing of the vehicle;

said computer control means being arranged to cause movement of the support member relative to carriage in said at least one subsequent pass over the vehicle in dependence on the stored side profile;

said computer control means being arranged to maintain the support member in a fixed raised position relative to the carriage as the carriage is moved between a front end and a rear end of the vehicle in said first pass while the scanning means is operated.

7. Apparatus for washing vehicles comprising:

a vehicle receiving station into which a vehicle can be moved longitudinally to a wash position therein;

a carriage having a carriage support and drive arrangement mounting the carriage for movement relative to the station longitudinal of the vehicle in the wash position, the station and carriage being arranged such that the station supports the vehicle in fixed stationary position during movement of the carriage and washing and such that movement necessary to effect the washing is carried out by the carriage;

a plurality of high pressure spray nozzles mounted on the carriage for non-contact cleaning of the vehicle by high pressure fluid;

a support member carried by the carriage for longitudinal movement therewith and movable in a direction upward and downward relative to the carriage and therefore relative to the vehicle, at least some of the spray nozzles being mounted on the support member for movement therewith;

means for detecting a series of positions of the carriage as it is moved longitudinally of the station with the vehicle stationary in the station;

scanning means mounted on the carriage for movement therewith for detecting at each of said series of positions a height of the vehicle;

computer control means having a memory for storing said positions and said heights so as to store information defining a side profile of the vehicle;

said computer control means being arranged to cause said carriage to move along the station in a first pass and to store said information from said first pass;

said computer control means being arranged to cause said carriage including the scanning means and the support member to move along the station in at least one subsequent pass over the vehicle to effect washing of the vehicle;

said computer control means being arranged to cause movement of the support member relative to carriage in said at least one subsequent pass over the vehicle in dependence on the stored side profile;

wherein the array is arranged on the carriage forwardly of the support member for detecting, as the carriage is moved forwardly, an end surface of the vehicle in advance of the support member reaching the end surface;

and wherein the computer control means is arranged, in the first pass on detecting the end surface, to maintain the carriage stationary while the support member is moved along the end surface.

8. Apparatus for washing vehicles comprising:

a vehicle receiving station into which a vehicle can be moved longitudinally to a wash position therein;

a carriage having a carriage support and drive arrangement mounting the carriage for movement relative to the station longitudinal of the vehicle in the wash position, the station and carriage being arranged such that the station supports the vehicle in fixed stationary position during movement of the carriage and washing and such that movement necessary to effect the washing is carried out by the carriage;

a plurality of high pressure spray nozzles mounted on the carriage for non-contact cleaning of the vehicle by high pressure fluid;

a support member carried by the carriage for longitudinal movement therewith and movable in a direction upward and downward relative to the carriage and therefore relative to the vehicle, at least some of the spray nozzles being mounted on the support member for movement therewith;

means for detecting a series of positions of the carriage as it is moved longitudinally of the station with the vehicle stationary in the station;

scanning means mounted on the carriage for movement therewith for detecting at each of said series of positions a height of the vehicle;

computer control means having a memory for storing said positions and said heights so as to store information defining a side profile of the vehicle;

said computer control means being arranged to cause said carriage to move along the station in a first pass and to store said information from said first pass;

said computer control means being arranged to cause said carriage including the scanning means and the support member to move along the station in at least one subsequent pass over the vehicle to effect washing of the vehicle;

said computer control means being arranged to cause movement of the support member relative to carriage in said at least one subsequent pass over the vehicle in dependence on the stored side profile;

wherein the spray nozzles include a first set of spray nozzles mounted on the carriage for movement therewith, the first set being mounted on a pair of depending side members each arranged on the carriage on a respective side of the vehicle with the spray nozzles thereon arranged for spraying inwardly toward a side of the vehicle and a second set of nozzles mounted on the support member for movement therewith and arranged to spray toward front, top and rear surfaces of the vehicle;

wherein there is provided means for closing the flow of cleaning fluid to selected ones of the first and second sets of spray nozzles;

wherein the computer control means includes manual input means for inputting information as to whether the vehicle to be cleaned is loaded or unloaded;

and wherein the computer control means is arranged to control the selected ones in dependence upon the information such that the spray nozzles of the second set are closed during passage of the support member over a top of the vehicle if the vehicle is loaded.

9. Apparatus for washing vehicles comprising:

a vehicle receiving station into which a vehicle can be moved longitudinally to a wash position therein;

a carriage having a carriage support and drive arrangement mounting the carriage for movement relative to the station longitudinal of the vehicle in the wash position, the station and carriage being arranged such that the station supports the vehicle in fixed stationary position during movement of the carriage and washing and such that movement necessary to effect the washing is carried out by the carriage;

a plurality of high pressure spray nozzles mounted on the carriage for non-contact cleaning of the vehicle by high pressure fluid;

a support member carried by the carriage for longitudinal movement therewith and movable in a direction upward and downward relative to the carriage and therefore relative to the vehicle, at least some of the spray nozzles being mounted on the support member for movement therewith;

means for detecting a series of positions of the carriage as it is moved longitudinally of the station with the vehicle stationary in the station;

scanning means mounted on the carriage for movement therewith for detecting at each of said series of positions a height of the vehicle;

computer control means having a memory for storing said positions and said heights so as to store information defining a side profile of the vehicle;

said computer control means being arranged to cause said carriage to move along the station in a first pass and to store said information from said first pass;

said computer control means being arranged to cause said carriage including the scanning means and the support member to move along the station in at least one subsequent pass over the vehicle to effect washing of the vehicle;

said computer control means being arranged to cause movement of the support member relative to carriage in said at least one subsequent pass over the vehicle in dependence on the stored side profile;

wherein the spray nozzles include a first set of spray nozzles mounted on the carriage for movement therewith, the first set being mounted on a pair of depending side members each arranged on the carriage on a respective side of the vehicle with the spray nozzles thereon arranged for spraying inwardly toward a side of the vehicle and a second set of nozzles mounted on the support member for movement therewith and arranged to spray toward front, top and rear surfaces of the vehicle;

wherein the first set includes vertically spaced subsets of the nozzles and wherein at least one of the subsets is closed in response to detection of a height of the side profile which less than the height of the subset.

* * * * *